United States Patent [19]

Baghdachi

[11] Patent Number: 4,889,903
[45] Date of Patent: Dec. 26, 1989

[54] FAST-CURE POLYURETHANE SEALANT COMPOSITION CONTAINING TITANIUM ESTER ACCELERATORS

[75] Inventor: Jamil Baghdachi, Northville, Mich.

[73] Assignee: BASF Corporation, Clifton, N.J.

[21] Appl. No.: 227,938

[22] Filed: Aug. 3, 1988

[51] Int. Cl.$^4$ .............................................. C08G 77/06
[52] U.S. Cl. ........................................ 528/17; 528/28; 528/34; 528/38; 528/901
[58] Field of Search ...................... 528/17, 34, 28, 38, 528/901

[56] References Cited

U.S. PATENT DOCUMENTS

| | | | |
|---|---|---|---|
| 3,151,099 | 9/1964 | Ceyzeriat et al. | 260/46.5 |
| 3,334,067 | 8/1967 | Weyenberg | 260/46.5 |
| 3,689,454 | 9/1972 | Smith et al. | 260/46.5 |
| 3,708,467 | 1/1973 | Smith, Jr. et al. | 260/195 |
| 3,779,794 | 12/1973 | De Santis | 117/72 |
| 3,779,986 | 12/1973 | Smith et al. | 260/46.5 G |
| 3,819,563 | 6/1974 | Takago et al. | 260/375 B |
| 3,979,344 | 9/1976 | Bryant et al. | 260/18 TN |
| 4,038,239 | 7/1977 | Coyner et al. | 260/33.6 |
| 4,111,890 | 9/1978 | Getson et al. | 260/37 SB |
| 4,221,896 | 9/1980 | Endo | 528/28 |
| 4,222,925 | 9/1980 | Bryant et al. | 524/589 |
| 4,412,013 | 10/1983 | Chang | 521/121 |
| 4,469,831 | 9/1984 | Bueltjer et al. | 524/112 |
| 4,623,738 | 11/1986 | Sugarman et al. | 524/108 |
| 4,707,515 | 11/1987 | Gilch et al. | 524/506 |

*Primary Examiner*—Melvyn I. Marquis
*Attorney, Agent, or Firm*—Jerry F. Janssen

[57] ABSTRACT

One-component, moisture-curable sealant compositions having fast cure times comprise a mixture of a silane-capped polyurethane polymer, an aminosilane cross-linking agent, and a titanium ester accelerator.

12 Claims, No Drawings

FAST-CURE POLYURETHANE SEALANT COMPOSITION CONTAINING TITANIUM ESTER ACCELERATORS

FIELD OF THE INVENTION

This invention relates to room temperature curable organic polymer sealant compositions. More particularly, this invention concerns fast cure one-part room temperature curable organic polymer sealant compositions containing titanium ester accelerating agents.

BACKGROUND OF THE INVENTION

Sealants are comprised of pigmented or unpigmented synthetic elastomeric polymers which, in the uncured state, constitute pourable or easily extrudable putty-like mastics. When cured, the sealants are transformed into elastomeric materials which are able to expand or contract with the relative motion of the structural elements which the sealant connects and seals. They also form a tight barrier against moisture, gases and chemicals. Such sealants find a wide variety of applications in the building trades industry and the automotive industry where they are widely used to seal fixed window panels and taillight glass panels to coated auto, truck, and bus bodies.

Such sealants include compositions based on polysiloxane polymers as well as others which include polyurethane or polyacrylate polymers. Additionally, modern sealant compositions include one-part and two-part formulations which cure by a variety of chemical mechanisms. One-part sealant compositions generally contain an end-capped base polymer together with a reactive cross-linking agent and, typically, a curing catalyst which promotes the cross-linking reaction either in the presence of heat or atmospheric moisture. Upon application under normal conditions of temperature and moisture, one-part sealants react to form tough, pliable elastomeric seals.

Two-part sealant compositions, on the other hand, comprise two reactive components which are separately packaged and mixed just prior to or at the time of application and react upon mixing to form the semi-rigid sealant bead.

Two-part sealant compositions are less convenient to use since it is necessary to mix the components prior to use or meter the components during application to insure correct proportions if the two components are applied together to form the sealant bead. For this reason, one-part sealants have found wide acceptance in the market. A number of such one-part moisture-curable sealant compositions are known. Because of their convenience and ease of use, there has been increasing demand for such sealants, especially if they possess both good shelf life and rapid curing rates. To enhance the curing rates of moisture-cured sealants, a variety of curing catalysts have been incorporated into such one-part compositions. The following U.S. patents disclose one-part moisture-curable polyurethane based sealant compositions and curing catalysts: 3,779,794 to De Santis (1,2,4-trimethylpiperazine); 3,979,344 to Bryant (dibutyl tin diacetate); 4,038,239 to Coyner, et al. (metallic salts of tin, lead, mercury, or Group VIII such as iron, organo-tin (IV) and organo-lead compounds, and organic amines such as trialkylamines, N-substituted piperidines, N,N,-substituted piperazines, pyridine); 4,469,831 to Bueltjer, et al. (aliphatic or aromatic carboxylic acids, toluenesulfonic acid); and 4,707,515 to Gilch, et al. (organic and inorganic acids, salts of organic acids such as tin naphthenate, tin octoate, tin butyrate, dibutyltin dioctoate, dibutyltin dilaurate, dibutyltin diacetate, iron stearate, lead octoate, or organic amines).

SUMMARY OF THE INVENTION

It has been found, in accordance with the present invention, that one-component polyurethane-based sealant compositions having fast cure rates at room temperature in the presence of moisture comprise a mixture of a silicon-terminated polyurethane polymer, from about 0.2 to about 1.0 part by weight of an aminosilane crosslinking agent, per 100 parts by weight of the polyurethane polymer, and from about 0.2 to about 1.0 part by weight of a titanium ester accelerator per 100 parts of the polyurethane polymer.

The silane-capped polyurethane polymer has the structure

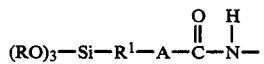
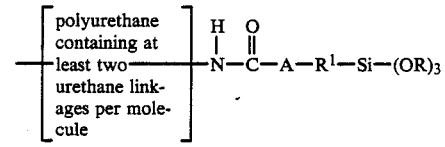

where R is lower alkyl of from 1 to 6 carbon atoms and $R^1$ is a divalent bridging radical selected from the group consisting of divalent hydrocarbon radicals, divalent hydrocarbon ether radicals, and divalent hydrocarbon amino radicals. The group A is selected from —S— and —$NR^2$— where $R^2$ is hydrogen or alkyl of from one to six carbon atoms.

The aminosilane has the structure

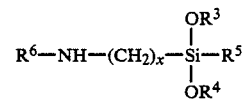

where x is an integer of from one to three, and $R^3$ and $R^4$ may be the same or different and are selected from alkyl of from one to four carbon atoms. The group $R^5$ is alkyl of from one to four carbon atoms or alkoxyl of from one to four carbon atoms and $R^6$ is hydrogen or —$(CH_2)_y NHR^7$ where $R^7$ is hydrogen or —$(CH_2)_z NH_2$. The subscripts y and z may be the same or different and are integers of from one to three.

The titanium ester accelerator has the structure

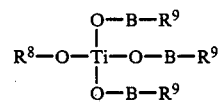

where B is a direct bond or is —$SO_2$— and $R^8$ is a hydrocarbyl group of from three to twenty carbon atoms. $R^9$ is —$(R^{10}-NH)_m-R^{10}-NH_2$ where m is zero or an integer of from one to four and $R^{10}$ is selected from divalent hydrocarbyl radicals of from two to ten carbon atoms, divalent hydrocarbaryl radicals of from six to ten carbon atoms, and divalent cyclohydrocarbyl radicals of from six three to ten carbon atoms.

The composition may also contain other ingredients generally known to formulators of polymeric sealant compositions such as pigments, thixotropic agents, fillers, acidic or basic polymerization agents, and the like.

DETAILED DESCRIPTION OF THE INVENTION

The sealant compositions of the present invention comprise a base silane-capped polyurethane polymer having a number average molecular weight in the range of from about 10,000 to about 30,000. Such silane-capped polyurethane polymers are prepared by conventional polymerization techniques by reacting a polyether having at least two free hydroxyl groups per molecule with an isocyanate compound having at least two isocyanate reactive groups per molecule. The polyether polyol and isocyanate compound are reacted in a weight ratio of about 8:1 to about 12:1, respectively. The starting polyether polyol preferably has a number average molecular weight of between about 1,000 and 5,000. One such preferred starting material is polypropylene glycol available as Polypropylene Glycol 2025 from Union Carbide Co., 270 Park Avenue, New York, N.Y. 10017.

The starting isocyanate compound may be selected from a variety of materials known in the art for such purposes, but one such preferred material is toluene diisocycanate.

The copolymer formed by reaction of these two monomers is end-capped with a silane group having the structure —A—R$^1$—Si—(OR)$_3$. The group A is sulfur or an alkylamino group in which the alkyl portion contains from one to six carbon atoms. The bridging group R$^1$ may be a divalent hydrocarbon radical, a divalent hydrocarbon radical containing one or more oxygen ether linkages, or a divalent hydrocarbon radical containing one or more >NH linkages. The end-capping of the polyurethane polymer is achieved by including in the reaction mixture containing the polyether polyol and isocyanate compound an aminosilane compound such as gamma-aminopropyl trimethoxysilane (A 1110) availiable from Union Carbide Corp., 270 Park Ave., New York, N.Y. 10017).

The silane-capped polyurethane polymer is mixed with from about 30 to about 40 parts by weight of a pigmenting agent such as carbon black per 100 parts by weight of the capped polyurethane polymer. Small amounts, ranging from about 0.25 to about 0.75 parts by weight of a thixotropic agent per 100 parts by weight of polyurethane polymer may also be added to adjust the flow characteristics of the sealant composition. A typical thixotropic agent is Thixseal 1085 available from NL Chemicals, Inc., Heightstown, N.J. 08520.

Additional aminosilane cross-linking agent is added to the sealant composition in amounts ranging between about 0.2 to about 1.0 parts by weight (preferably between about 0.4 to about 0.8 parts by weight) per 100 parts by weight of the polyurethane polymer. The aminosilane used is selected from compounds having the formula

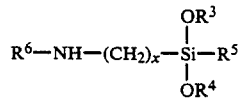

where x is an integer of from one to three and R$^3$ and R$^4$ may be the same or different and are selected from alkyl of from one to four carbon atoms. The group R$^5$ is alkyl of from one to four carbon atoms or alkoxyl of from one to four carbon atoms and R$^6$ is hydrogen or —(CH$_2$)$_y$NHR$^7$. R$^7$ is hydrogen or —(CH$_2$)$_z$NH$_2$ wherein y and z may be the same or different and are integers of from one to three. Suitable materials for this purpose are aminosilanes such as A 1110, A 120, and A 1130, available from Union Carbide Corp., 270 Park Ave., New York, N.Y. 10017).

As used throughout this specification and the appended claims, the term "alkyl" means a hydrocarbon residue derived from branched or unbranched alkane by removal of a single hydrogen atom. The term "alkoxyl" denotes alkyl groups attached through an oxygen ether linkage to the remainder of the parent molecule.

The sealant compositions of this invention further contain from about 0.2 to about 1.0 parts by weight (preferably between about 0.2 to 0.8 parts by weight) per 00 parts by weight of the polyurethane polymer of a titanate ester accelerator having the structure

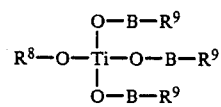

where B is a direct bond or is —SO$_2$—. The group R8 is a hydrocarbyl group of from three to twenty carbon atoms, and R$^9$ is —(R$^{10}$—NH)$_m$—R$^{10}$—NH$_2$ where m is zero or an integer of from one to four. R$^{10}$ is selected from a divalent hydrocarbyl radical of from two to ten carbon atoms, a divalent hydrocarbaryl radical of from six to ten carbon atoms, and a divalent cyclohydrocarbyl radical of from six three to ten carbon atoms.

As used throughout this specification and the appended claims, the term "divalent hydrocarbyl" means a branched or unbranched hydrocarbon group derived by removal of two hydrogen atoms from a saturated or unsaturated acyclic hydrocarbon. The term "divalent hydrocarbaryl" denotes a group derived from the removal of two hydrogen atoms from hydrocarbons containing one or more carbocyclic aromatic rings including phenyl, alkylphenyl, and phenylalkyl and the like. The term "divalent cyclohydrocarbyl" means a group derived by the removal of two hydrogen atoms from a carbocyclic non-aromatic hydrocarbon including cyclohexane, alkylcyclohexane, and the like.

Titanate esters of the type suitable for use in sealant compositions of the present invention are by the general methods disclosed in U.S. Pat. No. 4,623,738, the contents of which are incorporated herein by reference. It is preferred that the titanate esters which are employed as accelerators possess at least one primary or secondary amine group per molecule. Preferred materials include (4-aminobenzene)sulfanato-O, bis-(dodecylbenzene)sulfanato-O, 2-propanolato titanium (IV); 2-propanolato, tris-(3,6-diaza)hexanolato titanium (IV); 2,2-bis-(2-propenolatomethyl)butanolato, tris-(2-ethylenediamino)ethylato titanium (IV); and 2,2-bis-(2- propenolatomethyl)butanolato, tris-(3-amino)phenylato titanium (IV), commercially available from Kenrich Petrochemicals, Inc., 140 East 22d Street, Bayonne, N.J. 07002).

It has been found in accordance with the present invention that the inclusion of such titanate ester accelerators in the sealant compositions significantly increases the cure rates over the cure rates for similar sealant compositions which lack the titanate ester accelerator compounds, as can be seen from the data provided in the Examples and in Tables 1 and 2 below. Enhanced cure rates provide an important advantage when the sealants of this invention are employed, for example, in sealing fixed window panels and taillight glass panels to motor vehicle bodies where slowly curing sealants may present problems in a continuous production assembly line operation.

The following examples are provided to enable one skilled in the art to practice the present invention. These examples are merely illustrative of the present invention and are not to read as limiting the scope of the invention which is defined by the appended claims.

EXAMPLE 1

A silane-capped polyurethane polymer of the type described in U.S. Pat. No. 3,632,557 was prepared as follows:

| | |
|---|---|
| A. Niax PPG 2025 ONE (2000 Molecular weight polyether polyol available from Union Carbide Corp., 270 Park Ave., New York, NY 10017) | 2001.00 g |
| Hylene TM (80:20 Grade toluene diisocyanate available from E. I. duPont de Nemours & Co., Wilmington, DE 19898) | 204.00 g |
| Glacial acetic acid | 0.55 g |
| Dibutyltin diacetate | 0.45 g |
| B. Anhydrous toluene | 110.00 g |
| C. Anhydrous toluene | 81.00 g |
| Silane A 1110 (gamma-aminopropyl)trimethoxy silane available from Union Carbide Corp., 270 Park Ave., New York, NY 10017) | 68.30 g |
| D. Anhydrous methanol | 273.00 g |

The components of A above were mixed and heated to 155°F. (68.3° C.) under anhydrous conditions and maintained at that temperature for fifty-five minutes. At the end of that time, B was added. Over the next forty-five minutes, the temperature of the mixture was gradually reduced to 105° F. (40.6° C.) and heating was continued for two and one-quarter hours. At the end of this time, C was added to the mixture and the resulting mixture was heated at 150°–165° F. (65.6°–73.9° C.) for an additional two and one-quarter hours. During this time, samples of the reaction mixture were tested for free isocyanate functional groups. When the tests indicated no residual free isocyanate, D was added and the mixture heated under reflux for a short time. The mixture was degassed and cooled to room temperature.

EXAMPLE 2

A mixer equipped with a sweep blade and a high speed disperser was charged with 101 lb (45.91 kg) of the polymeric composition prepared as described in Example 1. Under anhydrous conditions, 9 lb (4.09 kg) of anhydrous methanol was added to the mixer contents and the resulting mixture was stirred for about five to ten minutes. To this mixture was then added 0.5 lb (0.23 kg) of Silane A1120 (Union Carbide Company, 270 Park Avenue, New York, N.Y. 10017), 0.7 lb (0.32 kg) of Thixseal 1084 (NL Chemicals, Inc., Heightstown, N.J. 08520) 0.6 lb (0.27 kg) of DBTDA antioxidant (AO 2246, American Cyanamide Co., Bound Brook, N.J. 08805), 0.5 lb (0.23 kg) of 2,2bis(2-propenalatomethyl)-butanalato, tris(3-amino)phenylato titanium (IV) (LICA 97, Kenrich Petrochemicals, Inc., 140 East 22d Street, Bayonne, N.J. 07002), and 0.11 lb (0.05 kg) of dibutyltin diacetate. The resulting mixture was stirred under anhydrous conditions for twenty minutes. Carbon black (40 lb, 18.18 kg) which had been previously dried to less than 0.05% by weight moisture content and the resulting mixture was heated to 140°–150° F. (60°–65.5° C.) and stirred for one hour.

After this time the mixture was allowed to cool for ten to fifteen minutes, was degassed under reduced pressure, and packaged under anhydrous conditions. This material was found to possess good storage stability when tested under accelerated storage conditions (130° F. (54.4° C.) for three days). The material was packaged under anhydrous conditions and its properties tested as described below and compared with a similar material which lacked the titanium ester accelerator. The results of this testing appear in Table 1 below.

EXAMPLE 3

A second batch of one-part fast curing sealant composition was prepared using the general methods of Example 1 and 2 with the following ingredients in the indicated proportions. In this example, 2,2(bis-2-propenalatomethyl)butanalato, tris (2-ethylenediamino)-ethylato titanium (IV) (LICA 44, Kenrich Petrochemicals, Inc., 140 East 22d Street, Bayonne, N.J. 07002) was substituted for the 2,2-bis(2-propenolatomethyl)-butanalato, tris(3-amino)phenylato titanium (IV) (LICA 97) used as the accelerator in Example 2.

SILANE-CAPPED POLYURETHANE BASE POLYMER COMPOSITION

| Silane-Capped Polyurethane Base Polymer Composition | |
|---|---|
| Polypropylene glycol 2025 | 806.6 g |
| Acetic acid | 0.2 g |
| Toluene diisocycnate | 84.1 g |
| Silane A 1110 | 28.8 g |
| Dibutyl tin diacetate | 0.2 g |
| Toluene | 80.0 g |
| One-Part Sealant Composition | |
| Silane-capped polyurethane polymer composition (above) | 658.4 g |
| Antioxidant AO 2246 | 4.5 g |
| Thixseal 1085 (thixotropic agent) | 3.2 g |
| Dibutyl tin diacatetate | 0.6 g |
| Carbon black | 264.6 g |
| Silane A-1120 | 3.9 g |
| LICA 44 titanate ester accelerator (available from Kenrich Petrochemicals, Inc., 140 East 22d Street, Bayonne, NJ 07002) | 2.9 g |
| Methanol | 61.9 g |

This material was packaged under anhydrous conditions and its properties tested as described below. The results appear in Table 2.

EXAMPLE 4

The general procedures of Example 1 and 2 were followed to prepare a polymeric sealant composition in which 2,2-bis-(2-propenolatomethyl)butanolato, tris(2-ethylenediamino)ethylato titanium (IV) (KR 44, Kenrich Petrochemicals, Inc., 140 East 22d Street, Bayonne, N.J. 07002) was used as the titanium ester accelerator compound in place of the 2,2-bis(2-propenolatomethyl)-butanalato, tris(3-amino)-phenylato titanium (IV) used in Example 2.

This material was found to have a rapid curing rate, exhibiting a lap shear strength of 85 psi (76.1 kP) after 3 hours of curing at room temperature and 50% relative humidity.

EXAMPLE 5

A moisture-curable one-part sealant composition was prepared using the general methods of Examples 1 and 2 but substituting (4-aminobenzene)sulfanato-O, bis-(dodecylbenzene)sulfanato-0, 2-propanolato titanium (IV) (KR 26S, Kenrich Petrochemicals, Inc., 140 East 22d Street, Bayonne, N.J. 07002) as the titanate ester accelerator compound in place of the 2,2-bis(2-propenolatomethyl)-butanalato, tris(3-amino)-phenylato titanium (IV) used there.

The resultant material was tested both on painted test plates as described further below and on ceramic glazed glass test plates. In these tests, the sealant composition was found to cure rapidly, developing a lap shear strength of 68 psi ( kP) and 65 psi ( kP) on metal-to-metal and glass-to-metal test plates, respectively after three hours at 50% relative humidity.

TESTING PROCEDURES

The lap shear strength of the sealant material of Example 2 was tested and compared with a similar material which did not contain the titanate ester curing catalyst. In each instance, pairs of shear strength test plates were prepared by bonding two previously primed and painted steel plates, each 1 inch by 0.32 inches (2.54 cm x 0.81 cm), with a sealant bead 1 inch long by 0.25 inches wide by 5/16 inches thick (2.54 cm x 0.64 cm x 0.79 cm). The sealant bead was applied along one of the one-inch edges of the test plates by means of a sealant tube. The plates were then pressed together so that the sealant bead was about 0.25 inches (0.64 cm) thick.

The sealant bead applied to the bonded test plates was allowed to cure at room temperature and 50% relative humidity for periods which varied between three and seventy-two hours. After the appropriate cure time in each case, the shear strength of each sealant bead was tested on an Instron testing machine by pulling in a direction parallel to the faces of the bonded test plates. The results of these tests appear in Table 1.

TABLE 1
Shear Strength and Properties of Sealant Composition of Example 2

| Property | Titanium-Containing Sealant Composition of This Invention | Titanium-free Sealant Composition |
|---|---|---|
| Lap Shear Strength After 3 Hours | 61 psi (54.6 kP) | 11 psi (9.84 kP) |
| Lap Shear Strength After 24 Hours | 530 psi (474.2 kP) | 350 psi (313.2 kP) |
| Lap Shear Strength After 48 Hours | 681 psi (609.3 kP) | 595 psi (532.4 kP) |
| Lap Shear Strength After 72 Hours | 975 psi (872.4 kP) | 955 psi (854.5 kP) |
| Viscosity | 37 sec | 42 sec |
| Tensile Strength | 1100 psi (984.2 kP) | 1100 psi (984.2 kP) |
| Elongation | 250% | 250% |
| Hardness (Shore A Durometer) | 60 | 60 |
| Slump | None | None |

TABLE 2
Shear Strength and Properties of Sealant of Example 3

| Property | Titanium-Containing Sealant Composition of This Invention | Titanium-Free Sealant Composition |
|---|---|---|
| Lap Shear Strength After 3 Hours | 97 psi (86.8 kP) | 10 psi (8.95 kP) |
| Lap Shear Strength After 24 Hours | 580 psi (518.9 kP) | 400 psi (357.9 kP) |
| Lap Shear Strength After 48 Hours | 610 psi (545.8 kP) | 630 psi (563.7 kP) |
| Lap Shear Strength After 7 Days | 1010 psi (903.7 kP) | 992 psi (887.6 kP) |
| Viscosity | 43 sec | 41 sec |
| Tensile Strength | 999 psi (893.9 kP) | 1030 psi (921.6 kP) |
| Elongation | 270% | 241% |
| Hardness (Shore A Durometer) | 60 | 60 |
| Slump | None | None |

I claim:

1. A one-component, moisture-curable sealant composition comprising a mixture of
   (a) a silane-terminated polyurethane polymer of the formula

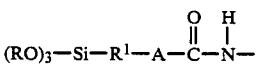
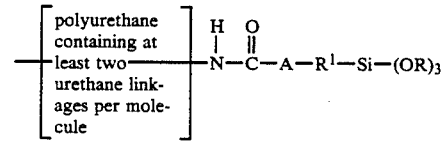

wherein
R is lower alkyl of from 1 to 6 carbon atoms;
$R^1$ is a divalent bridging radical selected from the group consisting of a divalent hydrocarbon radical, a divalent hydrocarbon ether radical, and a divalent hydrocarbon amino radical;
A is selected from the group consisting of —S— and —$NR^2$— where $R^2$ is hydrogen or alkyl of from one to six carbon atoms;
(b) from 0.2 to 1.0 parts by weight of an aminosilane per 100 parts by weight of said polyurethane polymer, said aminosilane having the structure

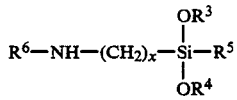

wherein
- x is an integer of from one to three; $R^3$ and $R^4$ are the same or different and are selected from alkyl of from one to four carbon atoms;
- $R^5$ is alkyl of from one to four carbon atoms or alkoxyl of from one to four carbon atoms;
- $R^6$ is hydrogen or $-(CH_2)_y NHR^7$ wherein $R^7$ is hydrogen or $-(CH_2)_z NH_2$ wherein y and z may be the same or different and are integers of from one to three;

(c) from 0.2 to 1.0 parts by weight of an accelerator per 100 parts by weight of said polyurethane polymer, wherein said accelerator has the structure

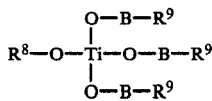

wherein
- B is a direct bond or is $-SO_2-$;
- $R^8$ is a hydrocarbyl group of from three to twenty carbon atoms, and
- $R^9$ is $-(R^{10}-NH)_m-R^{10}-NH_2$ wherein m is zero or an integer of from one to four;
- $R^{10}$ is selected from
  - a divalent hydrocarbyl radical of from two to ten carbon atoms, derived by removal of two hydrogen atoms from a branched or unbranched saturated or unsaturated acyclic hydrocarbon;
  - a divalent hydrocarbaryl radical of from six to ten carbon atoms, and
  - a divalent cyclohydrocarbyl radical of from three to ten carbon atoms.

2. A one-component, moisture-curable sealant composition as defined in claim 1 wherein said polyurethane polymer is the reaction product of a polyether polyol containing at least two hydroxyl groups per molecule and a number average molecular weight of about 1000 to about 3000 and an isocyanate having at least two isocyanate groups per molecule.

3. A one-component, moisture-curable sealant composition as defined in claim 1 wherein said polyurethane polymer has a number average molecular weight of from about 10,000 to about 30,000.

4. A one-component, moisture-curable sealant composition as defined in claim 3 wherein A is $-NR^2-$ where $R^2$ is as defined therein.

5. A one-component, moisture-curable sealant composition as defined in claim 1 wherein said composition comprises from 0.4 to 0.8 parts by weight of said aminosilane per 100 parts by weight of said polyurethane polymer.

6. A one-component, moisture-curable sealant composition as defined in claim 5 wherein said aminosilane is N-(beta-aminoethyl)-gamma-aminopropyl trimethoxysilane.

7. A one-component, moisture-curable sealant composition as defined in claim 1 wherein said composition comprises from 0.2 to 0.8 parts by weight of said accelerator per 100 parts by weight of said polyurethane polymer.

8. A one-component, moisture-curable sealant composition as defined in claim 1 wherein said accelerator is selected from the group consisting of
  (a) (4-aminobenzene)sulfanato-O, bis-(dodecylbenzene)sulfanato-O, 2-propanolato titanium (IV);
  (b) 2-propanolato, tris-(3,6-diaza)hexanolato titanium (IV);
  (c) 2,2-bis-(2-propenolatomethyl)butanolato, tris-(2-ethylenediamino)ethylato titanium (IV); and
  (d) 2,2-bis-(2-propenolatomethyl)butanolato, tris-(3-amino)phenylato titanium (IV).

9. A one-component, moisture-curable sealant composition as defined in claim 1 wherein said accelerator is (4-aminobenzene)sulfanato-O, bis-(dodecylbenzene)sulfanato-O, 2-propanolato titanium (IV).

10. A one-component, moisture-curable sealant composition as defined in claim 1 wherein said accelerator is 2-propanolato, tris-(3,6diaza)hexanolato titanium (IV).

11. A one-component, moisture-curable sealant composition as defined in claim 1 wherein said accelerator is 2,2-bis-(2-propenolatomethyl)-butanolato, tris-(2-ethylenediamino)ethylato titanium (IV).

12. A one-component, moisture-curable sealant composition as defined in claim 1 wherein said accelerator is 2,2-bis-(2-propenolato-methyl)butanolato, tris-(3-amino)phenylato titanium (IV).

* * * * *